May 13, 1941.  C. C. LEADER  2,242,006
DYNAMOELECTRIC MACHINE
Filed Oct. 25, 1939
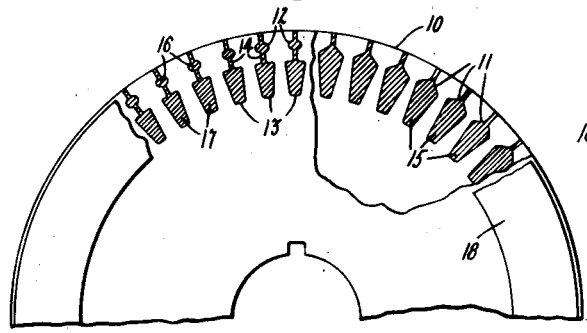
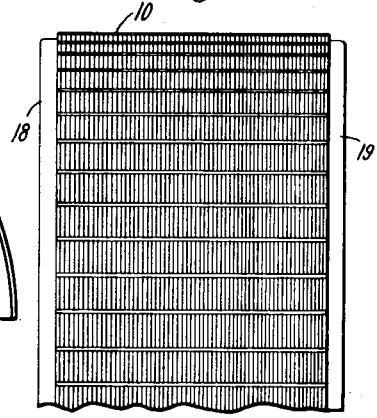
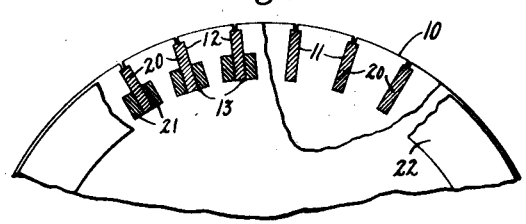
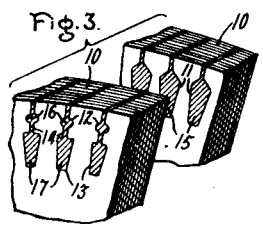
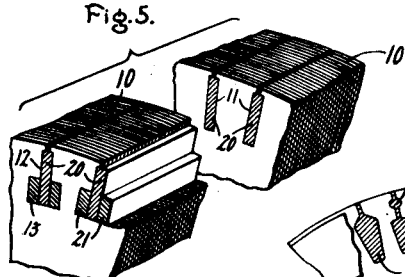
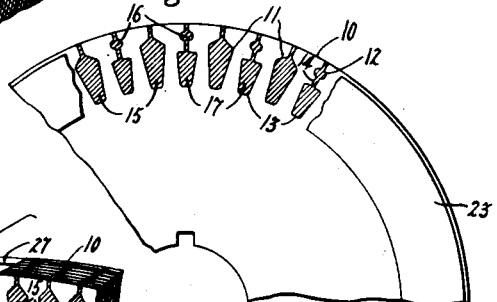
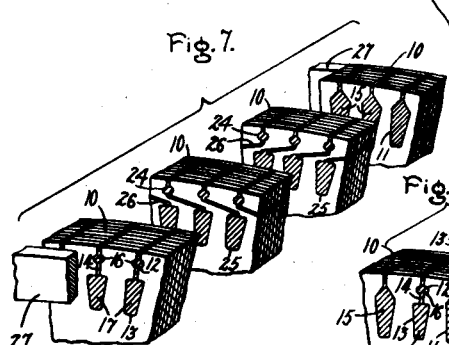
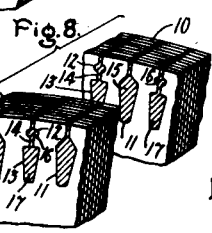
Inventor:
Charles C. Leader,
by Harry E. Dunham
His Attorney.

Patented May 13, 1941

2,242,006

UNITED STATES PATENT OFFICE 2,242,006

DYNAMOELECTRIC MACHINE

Charles C. Leader, Schenectady, N. Y., assignor to General Electric Company, a corporation of New York Application October 25, 1939, Serial No. 301,199

12 Claims. (Cl. 172—120)

My invention relates to improvements in dynamoelectric machines, and particularly to the type of machine utilizing a multiple section winding in a portion of one of the elements thereof.

An object of my invention is to provide a dynamoelectric machine wherein one element thereof is provided with a multiple section winding in a portion thereof.

Another object of my invention is to provide an improved dynamoelectric machine winding wherein a part of one of the windings is a multiple section winding and another part of the winding is a single section winding.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is an end view of a part of a dynamoelectric machine rotatable member embodying my invention, partly broken away to illustrate the relative arrangement of the winding; Fig. 2 is a partial side elevational view of the rotatable member shown in Fig. 1; Fig. 3 is an exploded perspective view of a part of the machine element shown in Fig. 1; Fig. 4 is an end view of a part of a dynamoelectric machine partly broken away to show a modification of the arrangement shown in Fig. 1; Fig. 5 is an exploded perspective view of a part of the machine element shown in Fig. 4; Fig. 6 is an end view of a part of a dynamoelectric machine rotatable member partly broken away to illustrate the winding arrangement of another modification of my invention; Fig. 7 is an exploded perspective view of a part of the rotatable member of a dynamoelectric machine illustrating a further modification of my invention; and Fig. 8 is an exploded perspective view of part of the machine element illustrating the modification of my invention shown in Fig. 6.

Referring to the drawing, I have shown in Fig. 1 a dynamoelectric machine rotatable member provided with a core formed of a plurality of laminations 10 of magnetic material having a plurality of winding slots arranged about the outer periphery thereof. Two types of winding slots are used in the laminations forming this core, both of which have been used in conventional squirrel cage induction motor rotors in the past. The improvement in the present construction is obtained by a combination of these conventional winding slots to provide improved operating characteristics which are not obtainable by the use of either of the conventional types of slots alone. In squirrel cage induction motor rotors, the windings generally have been provided with either single section windings or with multiple section windings including a high resistance section and a low resistance section or a winding which may be considered as having a low inductance section and a high inductance section. This latter type winding provides a desirably high starting torque, which is not obtainable by a comparable winding of the single section type. The multiple section winding, however, does not posses as high a maximum torque and has a greater full load slip than a comparable single section squirrel cage winding, and for this reason, single section windings often are used in this type machine. I have found that a desirably high starting torque, high maximum torque, and low full load slip may be obtained by the use of both of these types of windings in the same rotatable member. As shown in Fig. 1, I provide a group of laminations having relatively large deep single section slots 11 around the entire periphery of the laminations, and another group of laminations having a multiple section slot including an outer relatively small conductor slot section 12 and inner relatively large conductor slot section 13 with an interconnecting relatively narrow slot section or neck 14, which connects together the outer section 12 and the inner section 13. These multiple section slots are arranged around the entire periphery of this second group of laminations. As shown in Fig. 3, the slots in these two groups of laminations may extend over the same arcuate span of the different laminations, so that each of these types of laminations is provided with the same number of slots. With such an arrangement, the single section slots are arranged in registry longitudinally through the core with all of the sections of the multiple section slot. In certain instances, the number of slots in the two different types of laminations may be different, so that the single section slots may not correspond in number to the multiple section slots, and with such an arrangement only certain of the slots will extend longitudinally throughout all of the laminations. A winding is formed in the assembled laminations to conform to the various conductor slot sections, and in the portion of the core having the single slot sections 11, the conductors 15 are of a single resistance, single inductance type; and in an arrangement as shown in Fig. 3, these single section conductors are arranged in series with all of the sections of the multiple conductors in the multiple conductor slots. The conductors in the multiple conductor slots each include a relatively high resistance section 16 in the outer slot section 12, as these are of a relatively small cross-sectional area, and a relatively low resistance conductor section 17 in the inner large slot section 13, as these conductor sections are relatively larger than the sections 16. The relatively narrow connecting slot section 14, which connects the inner and outer sections of the multiple section slots, provides a winding having a relatively low inductance for the section 16 in the outer slot section 12 and a relatively higher inductance for the section 17 in the inner slot section 13. The single section conductors 15 all have a relatively low inductance, and this inductance remains substantially constant under the varying operating conditions from starting to running conditions. In the multiple conductor section of the winding, the effect of the inductance of the several parts of the winding varies considerably from starting to running conditions, producing a corresponding change in current distribution in the various sections of the conductors. This varying impedance effect in this portion of the winding produces an increase in the effective resistance of the multiple section conductor under starting conditions over the effective resistance under normal running conditions. This is a well known feature of this type winding. The operating characteristics of this type motor may be varied from almost the same as those of a conventional multiple section winding machine to those of a single section winding machine, depending upon the proportion of the two types of windings used in making up the complete winding of the rotatable member. With an arrangement as shown in Fig. 3, the slots in the two types of laminations are arranged in communication, and therefore, the two types of conductors are in series with each other, and the same current flows through each portion of each conductor bar. The ends of the different conductors are connected together by short circuiting end rings 18 and 19 to complete the squirrel cage winding.

Another embodiment of my improved dynamoelectric machine rotatable member utilizing this type of winding may be made from individual conductors as shown in Fig. 4. In this arrangement, as in the arrangement shown in Figs. 1 to 3, I utilize laminations having two different types of conductor slots. One group of these laminations 10 is formed with single section slots and the other group of laminations is formed with multiple section slots including an outer relatively small slot section 12 and an inner relatively large slot section 13. In this construction, single conductor sections 20 formed of bars of electrically conductive material, such as copper or aluminum, are arranged in the single section slots 11 and extend into the relatively narrow sections 12 of the multiple section slots and into a part of the inner sections 13 of these slots. Additional conductors 21 formed as bars are arranged on each side of the conductors 20 in the relatively large inner slot sections 13 of the multiple section slots. This provides a conductor of relatively large cross-section area in the inner portions 13 of the multiple conductor slots, and therefore, this portion of the winding is of a relatively lower resistance, and the outer portion of this multiple winding is of a relatively high resistance. Furthermore, since the outer slot section 12 is relatively narrow, the magnetic material forming the sides thereof extends inwardly about the outer side of the relatively large inner slot section 13, so that the inductance of the conductor section in this relatively large slot section is higher than the inductance of the outer conductor section. The inductance of this slot section also varies from a relatively high inductance to a relatively low inductance from start to normal running conditions, as explained with respect to Figs. 1 and 2, and the inductance of the single conductor section varies only slightly from start to normal running conditions. In addition, the effective resistance of the multiple conductor section is considerably higher under running conditions, as is well known with conventional windings of this type. In order to simplify this construction, the single section slots 11 are arranged in registry with the outer conductor slot sections 12 of the multiple section slots, so that a single conductor bar 20 may be inserted through both of these slots. The resistance of the conductor in the outer slot section 12 may also be increased over that in the inner slot section 13 by making the conductors 20 of a higher electrical resistance material than the conductors 21. The relative arrangement of these different conductors is more clearly illustrated in the exploded perspective view of the machine shown in Fig. 5. Short circuiting end rings 22 are arranged about the outer laminations, and are secured by welding, brazing, soldering, riveting, or in any other suitable manner, to the ends of the conductors 20 and 21 to connect together these conductors and complete the winding.

In Fig. 6, I have shown a further modification of my invention wherein all of the laminations 10 in the core are provided with the same arrangement of slots. Each lamination is provided with a single section slot 11 and a multiple section slot including an outer relatively small slot section 12 and an inner relatively large section 13 connected to the outer section 12 by a relatively narrow interconnecting section or neck 14. The relative number of single section slots and multiple section slots in each lamination may be varied as desired, and as shown in Fig. 6, these two types of slots may be arranged alternately about the periphery of the lamination. In assembling this type lamination, similar slot sections may be arranged in communication longitudinally through the core, so as to provide continuous single section slots and continuous multiple section slots longitudinally therethrough. Under certain conditions, it may be found desirable to arrange groups of these laminations to provide continuous single section slots and continuous multiple section slots longitudinally through different groups of laminations and to alternate the arrangements of the groups, so that single section slots in one group of laminations communicate with multiple section slots in the next adjacent group of laminations, as shown in Fig. 8. A cast squirrel cage winding is formed in these slots, and the conductors are made to conform to the various sections of the slots, so that a winding is provided having a variable start-to-run inductance and resistance to provide a desirable high starting torque, and a desirable high maximum torque and low full load slip. The relative proportion of these two desirable features may be varied by varying the relative number of the two types of slots used. Short circuiting end rings 23 are arranged about each end of the core and may be cast integrally with the conductors so as to connect them together and complete the squirrel cage winding.

A further modification of my invention is illustrated in Fig. 7, wherein laminations 10 are provided with three types of conductor sections. Laminations having the same type of slot sections are assembled in groups, and the slots in different groups are arranged substantially in communication with each other longitudinally through the core. I provide a group of laminations 10 with a single slot section 11, a second group of laminations with a multiple section slot having an outer relatively small section 24 and a relatively large inner section 25 connected to the outer section 24 by a relatively narrow interconnecting section or neck 26. Each of these inner sections 25 is displaced out of radial alignment with respect to its connected outer section 24, so that it is radially in alignment with the outer section 24 of another slot in the same lamination. Laminations having a third type slot are provided having a relatively small outer section 12 and a relatively large inner section 13 connected to the outer section 12 by a relatively narrow interconnecting section or neck 14. In this third type slot, all of the slot sections are arranged in radial alignment. In forming the core, groups of laminations having the same type of slot section are assembled to provide continuous slots longitudinally through the respective groups of laminations, and these laminations are then assembled with these different slots in longitudinal alignment to provide a substantially continuous conductor longitudinally through the core. I have found it desirable to interrupt the continuity of the interconnecting neck section 14 longitudinally through the core, as is more fully explained and claimed in my copending application, Serial No. 301,200, filed October 25, 1939, and assigned to the same assignee as this application. In order to obtain this result, the radially offset multiple section slots provide an interruption of the continuity longitudinally through the core of the interconnecting sections 14 and 26, by arranging the laminations having this offset type slot adjacent to laminations having a slot section wherein the inner and outer sections are in radial alignment, as shown in Fig. 7. A further interruption of this interconnecting neck section is obtained by reversing a group of laminations having radially offset inner and outer sections, with respect to another group of similar laminations having inner and outer radially offset slot sections, so that the radial offset displacement of the inner and outer sections is in the opposite direction in the two groups of laminations, as shown in the central two groups of laminations in Fig. 7. A cast squirrel cage winding is formed in these slots, and is made to conform to the various sections of the different slots. The winding is completed by short circuiting end rings 27, which connect together the outer ends of the conductors in these slots.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A member for a dynamoelectric machine having an element of magnetic material with winding slots formed therein, a winding in said slots including conductors each formed as a single conductor winding section of relatively low inductance through a part of said slots and as a conductor section having a multiple inductance through another part of said slots, each of said single conductor sections being electrically connected in series with one of said multiple inductance conductor sections, said multiple inductance section part including an inner relatively low inductance section and an outer section of relatively higher inductance than said inner section, and means for connecting together said conductor sections to form a complete winding.

2. A member for a dynamoelectric machine having an element of magnetic material with winding slots formed therein, a winding in said slots including conductors each formed as a single relatively low resistance conductor winding section through a part of said slots and as a multiple resistance conductor winding section through another part of said slots, each of said single conductor sections being electrically connected in series with one of said multiple resistance conductor sections, said multiple resistance conductor winding section part including an inner relatively low resistance portion and an outer portion of relatively higher resistance than said inner portion, and means for connecting together said conductors to form a complete winding.

3. A member for a dynamoelectric machine having an element of magnetic material with winding slots formed therein, a winding in said slots including conductors each formed as a low resistance winding element through a part of said slots and as a multiple resistance conductor winding section through another part of said slots, said multiple resistance conductor winding section part including a relatively high resistance portion and a relatively low resistance portion with each multiple section connected electrically in series with one of said low resistance conductor winding parts, and means for connecting together said conductors to form a complete winding.

4. A member for a dynamoelectric machine having an element of magnetic material with winding slots formed therein, a winding in said slots including conductors each formed as a single substantially constant low inductance winding section through a part of each of said slots and as a varying start to run inductance winding section through another part of each of said slots connected electrically in series with said substantially constant inductance winding part, and means for connecting together said conductors to form a complete winding.

5. A member for a dynamoelectric machine having an element of magnetic material with winding slots formed therein, a winding in said slots including conductors each formed as a substantially single inductance conductor winding section through a part of each of said slots and as a multiple inductance conductor winding section through another part of said slots connected electrically in series with said single inductance winding part, and means for connecting together said conductors to form a complete winding.

6. A member for a dynamoelectric machine having an element of magnetic material with winding slots formed therein, a winding in said slots including conductors each formed as a single relatively low inductance conductor winding section through a part of said slots and as a conductor section having a multiple inductance through another part of said slots, said multiple inductance conductor section part including a relatively high inductance portion and a relatively lower inductance portion with each multiple section connected electrically in series with one of said single low inductance conductor winding part, and means for connecting together said conductors to form a complete winding.

7. A member for a dynamoelectric machine having an element of magnetic material with winding slots formed therein, a winding in said slots including conductors each formed as a single conductor winding section through a part of each of said slots and as a multiple resistance conductor winding section through another part of each of said slots connected electrically in series with said single conductor winding section, and means for connecting together said conductors to form a complete winding.

8. A member for a dynamoelectric machine having an element of magnetic material, a winding including single conductor sections of relatively low electrical resistance extending through part of said element and multiple conductor sections formed of a relatively high electrical resistance portion and a relatively low electrical resistance portion extending through another part of said element, each of said multiple conductor sections being electrically connected in series with only one of said single conductor sections, and means for connecting together the ends of said conductors to provide a complete winding.

9. A member for a dynamoelectric machine including an element of magnetic material having winding slots formed therein, a cast winding having conductors in said slots, each of said conductors being formed as a single relatively low electrical resistance conductor through part of each slot and as a multiple conductor of a relatively high electrical resistance outer portion and a relatively low electrical resistance inner portion through another part of each slot, said single conductor part and said multiple conductor part being connected electrically in series in each slot, and means including end rings for connecting together said conductors at the outer ends thereof.

10. A member for a dynamoelectric machine having a core comprising laminations provided with winding slots formed therein, a winding in said slots including conductors formed as a single relatively low resistance conductor winding section through said slots in a group of said laminations and as a multiple resistance conductor winding section through said slots in another group of said laminations, said slots of said group of laminations having multiple resistance conductor slots including an inner relatively low resistance portion and an outer portion of relatively higher resistance than said inner portion, said latter group of laminations including laminations wherein the slots are formed with the inner and outer portions substantially in radial alignment and other laminations wherein each of said inner and outer conductor sections of each slot is displaced out of radial alignment, and means for connecting together said conductors to form a complete winding.

11. A member for a dynamoelectric machine having a core comprising laminations provided with winding slots formed therein, a winding in said slots including conductors formed as a single relatively low resistance conductor winding through said slots in a group of said laminations and as a multiple resistance conductor winding through said slots in another group of said laminations, said slots of said group of laminations having multiple resistance conductor slots including an inner relatively low resistance portion and an outer portion of relatively higher resistance than said inner portion, said latter group of laminations including laminations wherein the slots are formed with the inner and outer portions of each slot, displaced out of radial alignment and arranged with certain of said laminations having the radial alignment displacement of said inner and outer conductor slot portions in the opposite direction to that in certain other of said laminations, and means for connecting together said conductors to form a complete winding.

12. A member for a dynamoelectric machine having a core comprising laminations provided with winding slots formed therein, a winding in said slots including conductors formed as a single relatively low resistance conductor winding through said slots in a group of said laminations and as a multiple resistance conductor winding through said slots in another group of said laminations, said slots of said group of laminations having multiple resistance conductor slots including an inner relatively low resistance portion and an outer portion of relatively higher resistance than said inner portion, said latter group of laminations including laminations wherein the slots are formed with the inner and outer portions substantially in radial alignment and other laminations wherein each of said inner and outer conductor sections of each slot is displaced out of radial alignment, said latter laminations being arranged with certain of said laminations having the radial alignment displacement of said inner and outer conductor slot portions in the opposite direction to that in certain other of said laminations, and means for connecting together said conductors to form a complete winding.

CHARLES C. LEADER.